(12) United States Patent
Nishida

(10) Patent No.: US 10,377,256 B2
(45) Date of Patent: Aug. 13, 2019

(54) CENTER SERVER, CHARGING FACILITY REGISTRATION SYSTEM INCLUDING SAME, AND CHARGING FACILITY REGISTRATION METHOD

(75) Inventor: Junichi Nishida, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 310 days.

(21) Appl. No.: 14/111,246

(22) PCT Filed: Apr. 5, 2012

(86) PCT No.: PCT/IB2012/000694
§ 371 (c)(1),
(2), (4) Date: Oct. 11, 2013

(87) PCT Pub. No.: WO2012/140486
PCT Pub. Date: Oct. 18, 2012

(65) Prior Publication Data
US 2014/0028257 A1  Jan. 30, 2014

(30) Foreign Application Priority Data
Apr. 13, 2011  (JP) .................................. 2011-089285

(51) Int. Cl.
*B60L 11/18* (2006.01)
*B60L 53/14* (2019.01)
(Continued)

(52) U.S. Cl.
CPC .......... *B60L 11/1824* (2013.01); *B60L 53/14* (2019.02); *B60L 53/30* (2019.02); *B60L 53/60* (2019.02);
(Continued)

(58) Field of Classification Search
CPC ....................... G01R 31/3606; B60L 11/1824
(Continued)

(56) References Cited

U.S. PATENT DOCUMENTS 5,413,493 A * 5/1995 Hoffman ............. B60L 11/1818
200/51.09
8,278,881 B2 * 10/2012 Woody .................... B60K 6/48
320/109
(Continued)

FOREIGN PATENT DOCUMENTS

JP    2006-112932 A    4/2006
JP    3847065 B2       9/2006
(Continued)

OTHER PUBLICATIONS

U.S. Appl. No. 16/449,586 filed Jun. 24, 2019.

*Primary Examiner* — Richard Isla
*Assistant Examiner* — Harry O'Neill-Becerril
(74) *Attorney, Agent, or Firm* — Sughrue Mion, PLLC

(57) ABSTRACT

A center server includes a receiver that receives position information transmitted from an electric vehicle that can be charged externally, a processing unit and a storage device. The position information is on a charging facility at which the electric vehicle has been charged. The processing unit determines a standard or specification of the charging facility based on the position information received by the receiver, and associates standard/specification information indicating the standard or specification of the charging facility with the position information on the charging facility, and stores the associated information in the storage device.

16 Claims, 7 Drawing Sheets

(51) Int. Cl.
*B60L 53/30* (2019.01)
*B60L 53/60* (2019.01)

(52) U.S. Cl.
CPC ..... *B60L 2240/622* (2013.01); *B60L 2240/72* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01)

(58) Field of Classification Search
USPC ............................................ 702/63; 320/109
See application file for complete search history.

(56) References Cited

U.S. PATENT DOCUMENTS

| | | | |
|---|---|---|---|
| 2002/0165661 | A1 | 11/2002 | Horikami |
| 2007/0096691 | A1* | 5/2007 | Duncan .................. G06F 1/263 320/114 |
| 2009/0234599 | A1* | 9/2009 | Watanabe ........... B60L 11/1816 702/63 |
| 2010/0017249 | A1* | 1/2010 | Fincham .................. B60L 3/12 705/412 |
| 2011/0213780 | A1 | 9/2011 | Suganuma et al. |
| 2012/0078553 | A1 | 3/2012 | Kuroda et al. |
| 2012/0109519 | A1* | 5/2012 | Uyeki ...................... B60L 7/14 701/439 |
| 2012/0116575 | A1* | 5/2012 | Prosser ................ G06Q 20/202 700/232 |
| 2012/0123670 | A1* | 5/2012 | Uyeki ................. B60L 11/1838 701/300 |
| 2013/0031121 | A1 | 1/2013 | Sera et al. |
| 2013/0038424 | A1* | 2/2013 | Katar .................... H04L 67/125 340/5.8 |
| 2013/0257364 | A1* | 10/2013 | Redding ................. H02J 5/005 320/108 |
| 2013/0257365 | A1* | 10/2013 | Redding ................. H02J 5/005 320/108 |
| 2015/0320162 | A1* | 11/2015 | Akin ........................ H02J 7/35 135/16 |
| 2016/0087686 | A1* | 3/2016 | Won ..................... H04B 5/0037 307/104 |

FOREIGN PATENT DOCUMENTS

| | | |
|---|---|---|
| JP | 2010-079583 A | 4/2010 |
| JP | 2010-101854 A | 5/2010 |
| JP | 2011027714 A | 2/2011 |
| JP | 2011086020 A | 4/2011 |
| JP | 2011237406 A | 11/2011 |
| WO | 2010/150665 A1 | 12/2010 |

* cited by examiner

FIG.5

| FACILITY ID | STANDARD/ SPECIFICATION INFORMATION | LATITUDE | LONGITUDE |
|---|---|---|---|
| A005667 | AC1 AC2 | 34.341474 | 137.204375 |
| A004898 | AC2 | ..... | ..... |
| D006657 | DC | ..... | ..... |
| D008778 | DC | ..... | ..... |
| ..... | ..... | ..... | ..... |

FIG.8

| ON-BOARD DEVICE ID | STANDARD/ SPECIFICATION INFORMATION | LATITUDE | LONGITUDE |
|---|---|---|---|
| 0001059 | AC100V | 34.341474 | 137.204375 |
| 0001237 | AC200V | ..... | ..... |
| 0003596 | DC | ..... | ..... |
| 0004896 | DC | ..... | ..... |
| ..... | ..... | ..... | ..... |

CENTER SERVER, CHARGING FACILITY REGISTRATION SYSTEM INCLUDING SAME, AND CHARGING FACILITY REGISTRATION METHOD

BACKGROUND OF THE INVENTION

1. Field of the Invention

The invention relates to a center server that relates to a charging facility for an electric vehicle that can be charged externally, a charging facility registration system that includes the center server, and a charging facility registration method.

2. Description of Related Art

Conventionally, there has been available a point registration device that registers a point in a moving body information system, for instance a car navigation system or a mobile phone terminal, regards the position at which a moving body has been charged as a permanent location of a charging device, and registers the position (for instance, refer to Japanese Patent No. 3847065).

Also available is an on-board point registration device (for instance, refer to Japanese Patent Application Publication No. 2010-101854 (JP 2010-101854 A)) that is appropriate for installation in plug-in hybrid vehicles and electric vehicles that are equipped with a car navigation system. In the point registration device, position information on a charging point, at which a battery has been charged, is acquired, and on the basis of the charging record at the charging point, it is determined to which of the defined categories the charging point belongs, and the charging point is associated with the determined category and with position information, and is registered in a map database of a car navigation system, as a point where charging is possible. The categories in the point registration device are classifications according to charging frequency and charging time.

In addition to being charged at home, electric vehicles such as plug-in hybrid vehicles and electric vehicles have to be charged outdoors in order to make up for the short travel range of the vehicles. However, charging facilities are as yet not sufficiently popularized or standardized. Published information relating to charging facilities has low precision, except for information relating to specific charging facilities. Unlike ordinary gas stations, for instance, charging facilities are small in scale. For example, in a case where the charging facility is disposed at a corner of a parking lot in a comparatively large leisure facility (for instance, a shopping mall), it may be unclear, on the basis of low-precision position information, where in the leisure facility the charging facility is disposed, so that it may be impossible to reach the charging facility. Even if the charging facility is eventually reached, differences in the standard or specification of the charging facility, for instance differences in the power source voltage of the charging facility, may render charging impossible at the charging facility.

In the inventions set forth in Japanese Patent No. 3847065 and JP 2010-101854 A described above, position information is gathered independently for individual vehicles (moving bodies). Therefore, the position information is of comparatively high precision, but it is difficult to obtain information on charging facilities at which the host vehicle does not stop over, or information on newly deployed charging facilities.

SUMMARY OF THE INVENTION

The invention provides a center server in which information that indicates the specification or standard of a charging facility is registered together with position information on the charging facility, which has high precision, a charging facility registration system that includes the center server, and a charging facility registration method.

A center server according to a first aspect of the invention includes: a receiver that receives position information transmitted from an electric vehicle that is able to be charged externally, the position information being on a charging facility at which the electric vehicle has been charged; a processing unit; and a storage device. The processing unit determines a standard or specification of the charging facility pertaining to the position information received by the receiver, and associates standard/specification information indicating the standard or specification, of the charging facility with the position information on the charging facility, and stores the associated information in the storage device.

A charging facility registration system according to a second aspect of the invention includes: the center server according the first aspect; and an on-board device that is installed in the electric vehicle, and that transmits to the center server at least the position information upon completion of charging, in the charging facility, of the electric vehicle on which the on-board device is installed.

A charging facility registration method according to a third aspect of the invention includes: receiving, by a center server, position information transmitted from an electric vehicle that is able to be charged externally, the position information being on a charging facility at which the electric vehicle has been charged, and determining, in the center server, a standard or specification of the charging facility, the position information on which is received; and associating, in the center server, standard/specification information indicating the standard or specification of the charging facility with the position information on the charging facility, and storing the associated information in a storage device.

According to the above-described aspects of the invention, it is possible to provide the center server in which the information that indicates the specification or standard of a charging facility is registered together with the position information on the charging facility, which has high precision, a charging facility registration system that includes the center server, and a charging facility registration method.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a diagram illustrating an example of charging facility information that is stored/registered in a charging facility database;

FIG. 8 is a diagram illustrating an example of charging facility information that is kept in a charging facility database (charging facility information before registration).

DETAILED DESCRIPTION OF EMBODIMENTS

Embodiments of the invention are explained below with reference to accompanying drawings.

Figure 1:
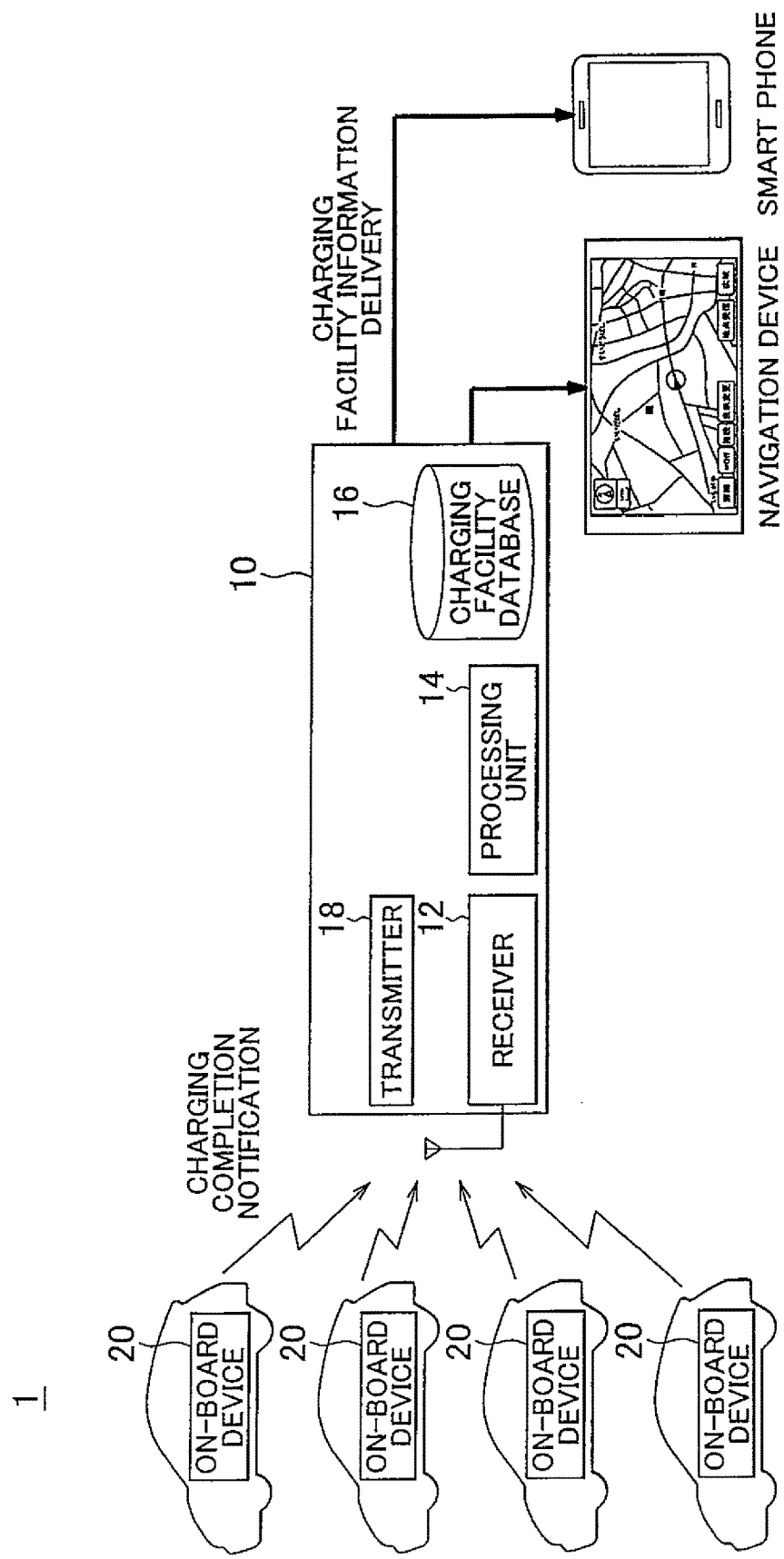
FIG. 1 is a diagram illustrating a system configuration of a charging facility registration system according to an embodiment.

FIG. 1 is a diagram illustrating a system configuration of a charging facility registration system 1 according to an embodiment of the invention.

The charging facility registration system 1 includes a center server 10, and on-board devices 20 that are installed in electric vehicles that can be charged in a charging facility. The electric vehicle that can be charged in a charging facility may be, for instance, a vehicle equipped with a battery (refer to a battery 32 in FIG. 2) that is used as a power source for a motor for driving the vehicle. The electric vehicle that can be charged in a charging facility is typically a plug-in hybrid vehicle or an electric vehicle. Hereafter, the electric vehicle that can be charged in a charging facility will be referred to simply as "vehicle".

The center server 10 is disposed at a location away from the vehicles. The center server 10 may be disposed at each geographical area (for instance, country or region) that is to be controlled. A plurality of the center servers may be disposed in the geographical area to be controlled, in which case the center server 10 is configured in the form of an aggregate of the plurality of center servers. Briefly, charging facility information (described below) in each geographical area to be controlled may be centrally managed by the center server 10 in the geographical area. The center server 10 may be configured so as to be capable of exchanging charging facility information between geographical areas to be controlled. To avoid an overly complex explanation, an instance is described below, for convenience, wherein a specific geographical area is controlled by one center server.

As illustrated in FIG. 1, the center server 10 includes a receiver 12, a processing unit 14, a charging facility database 16 and a transmitter 18. These functional units need not necessarily be disposed at one same location, and for instance the charging facility database 16 may be disposed at a remote location away from the processing unit 14.

As schematically illustrated in FIG. 1, the receiver 12 receives a charging completion notification (described below) from the on-board devices 20 installed in respective vehicles. Any wireless communication network, for instance a mobile phone network, can be used herein for communication.

The processing unit 14 may be made up of an arithmetic processing device such as a central processing (CPU). The function of the processing unit 14 may be realized by arbitrary items of hardware, software, firmware or combinations of the foregoing. For instance, arbitrary parts, or the entirety, of the function of the processing unit 14 may be realized by an application-specific integrated circuit (ASIC), a field-programmable gate array (FPGA) or a digital signal processor (DSP) for specific application. The processing unit 14 mainly executes a registration process of information relating to a charging facility. The function of the processing unit 14 will be explained in detail further on.

The charging facility database 16 may be made up of a rewritable storage device, for instance a hard disk drive. The charging facility database 16 may be configured in the form of an aggregate of a plurality of storage devices. The charging facility database 16 stores information (charging facility information) relating to charging facilities. The charging facility database 16 may have a data reposition region (FIG. 8) in which there is stored information for which a decision on whether the information is to be registered or not is still pending, and a data registration region (FIG. 5) in which there is stored charging facility information that is to be registered.

Figure 6:
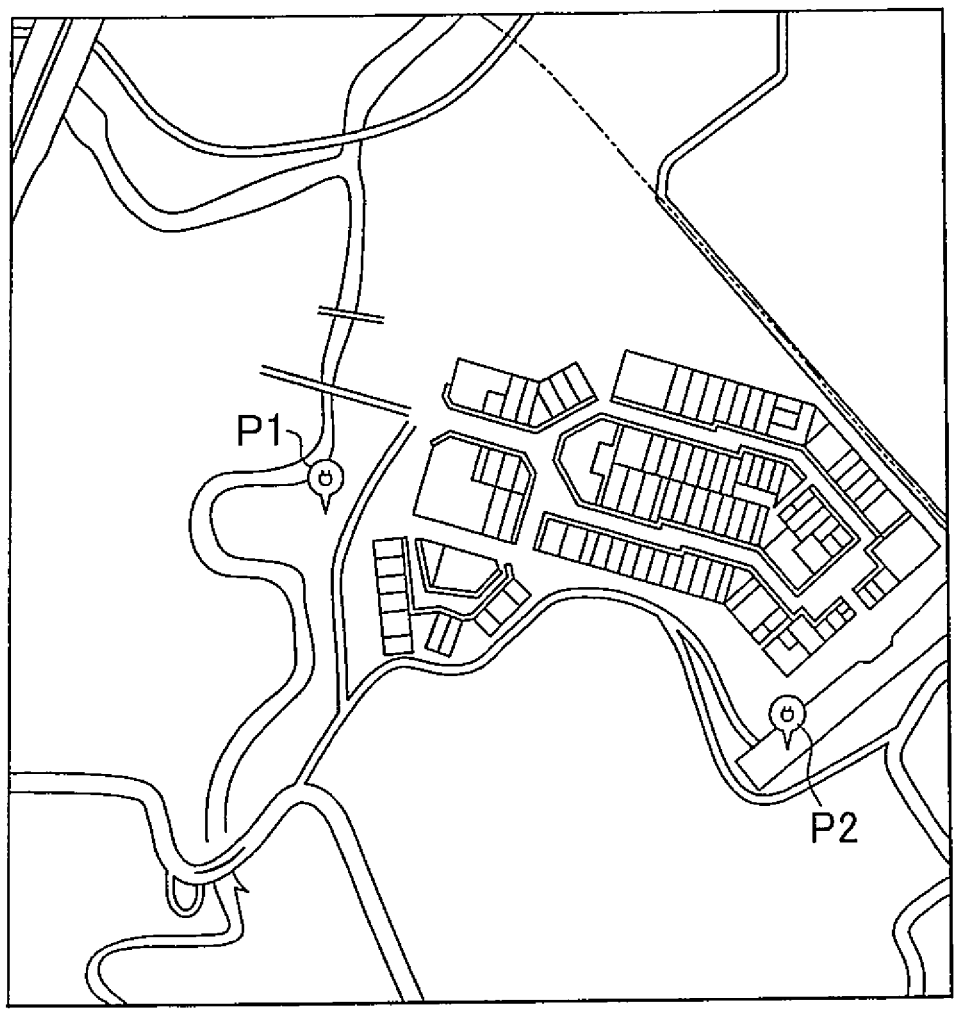
FIG. 6 is a diagram illustrating an example of a way in which the center server provides charging facility information to a user.

As illustrated schematically in FIG. 1, the transmitter 18 may transmit or deliver charging facility information (described below) to a user terminal (for instance, a car navigation device or a smart phone) periodically (for instance, at fixed intervals or whenever the charging facility information is updated) or non-periodically (for instance, upon request by the user). As described below, the charging facility information includes position information and standard/specification information on the charging facility. The user terminal has an application that outputs (for instance, displays) the charging facility information on the basis of the received charging facility information. For instance, a navigation device or smart phone may be configured so as to output a display that indicates the position of the charging facility, at a corresponding position on a map display (FIG. 6). The navigation device or smart phone may be configured so as to output, in response to an instruction by the user, detailed information (for instance, the below-described standard/specification information) on the charging facility. Alternatively, the charging facility information may be incorporated into map data and be transmitted to the user terminal. In this case, the map data that is provided to the user terminal may be updatable in accordance with updates of the charging facility information.

Figure 2:
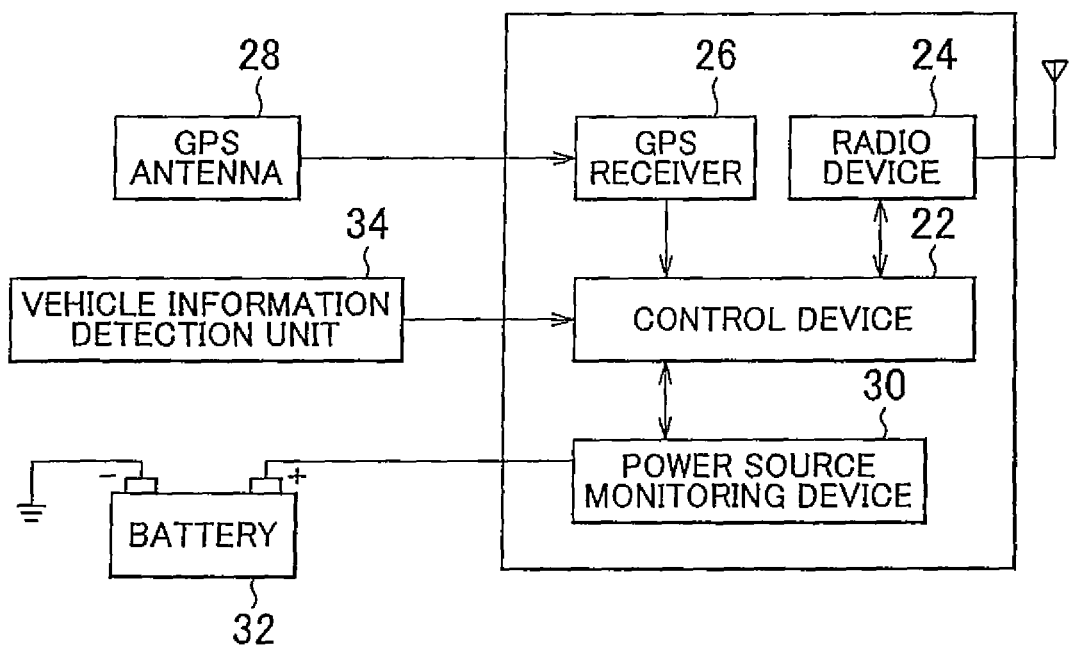
FIG. 2 is a schematic diagram illustrating an example of a relevant portion of an on-board device.

FIG. 2 is a schematic diagram illustrating an example of a relevant portion of an on-board device 20. The on-board device 20 is configured to include the control device 22 as a main device, as illustrated in FIG. 2. The control device 22 may be made up of a microcomputer. The function of the control device 22 may be realized by arbitrary items of hardware, software, firmware or combinations of the foregoing.

A radio device 24 is connected to the control device 22. The radio device 24 may be a communication module, for instance a data communication module (DCM) that is used in a telematics service. Under the control of the control device 22, the radio device 24 communicates wirelessly with the receiver 12 of the center server 10. For instance, the radio device 24 transmits a charging completion notification, generated in the on-board device 20, to the receiver 12 of the center server 10.

A global positioning system (GPS) receiver 26 is connected to the control device 22. The GPS receiver 26 determines and calculates the position of the vehicle on the basis of a GPS signal received from a GPS satellite, via a GPS antenna 28. The vehicle position calculated by the GPS receiver 26 is supplied to the control device 22. The positioning method in the GPS receiver 26 may be any method, for instance point positioning, differential positioning (such as interferometric positioning), inertial positioning or the like. The vehicle position may be corrected on the basis of the output of various sensors, for instance a vehicle speed sensor or a gyro-sensor, and/or on the basis of various information items that are received via a beacon receiver or a frequency modulation (FM) multiplex receiver. The vehicle position may also be appropriately corrected on the basis of map matching, through non-periodical use of map data in a map database (not shown) of an on-board navigation device.

A power source monitoring device 30 is connected to the control device 22. The power source monitoring device 30 detects the way in which the battery 32 is charged in the charging facility (i.e. the connection state of a dedicated charging cable). The battery 32 is used as a power source for a motor (not shown) for driving the vehicle. The power source monitoring device 30 may determine the way in which the battery 32 is charged in the charging facility on the basis of, for instance, a signal (for example, a divided voltage level of a pilot (CPLT) signal) from a unit on the side of the dedicated charging cable. Upon completion of charging of the battery 32 at the charging facility, the power source monitoring device 30 notifies this fact to the control device 22. Upon charging at the charging facility, the power source monitoring device 30 may detect the power source type and/or power source voltage of the charging facility on the basis of detected voltage (detected voltage of a power wire) during charging, or on the basis of a signal from a unit on side of the charging cable. For instance, the power source type of the charging facility may include alternating current (AC) and direct current (DC). The specification of the power source voltage of the charging facility may include 100 V and 200 V. When charging is being performed at the charging facility, the power source monitoring device 30 may detect the type of the charging facility on the basis of the charging speed. (for instance, rate of increase in state of charge (SOC) with respect to time). For instance, the type of charging facility may be ordinary charging equipment or fast charging equipment. For instance, a single-phase AC 100 V or 200 V power source is used in ordinary charging equipment, and a three-phase AC 200 V power source is used in fast charging equipment. The power source monitoring device 30 may supply these information items, if detected, to the control device 22. The function of the power source monitoring device 30 may be realized by the control device 22.

A vehicle information detection unit 34 is connected to the control device 22. The vehicle information detection unit 34 may be an on-board sensor or electronic control unit (ECU) that detects various vehicle information items.

Figure 3:
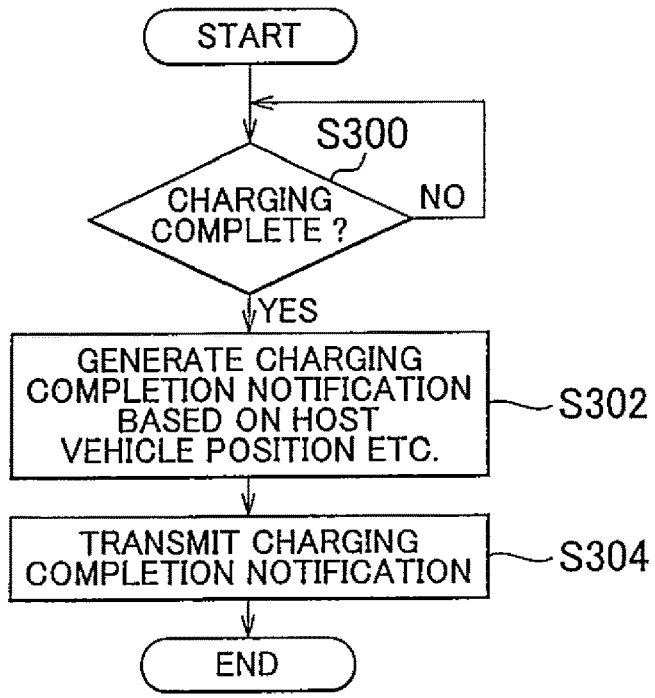
FIG. 3 is a flowchart illustrating an example of a main process that is executed by a control device in the on-board device.

FIG. 3 is a flowchart illustrating an example of a main process that is executed by the control device 22 of the on-board device 20. The process routine of FIG. 3 may be started upon detection of charging at the charging facility.

In step 300, the control device 22 determines, via the power source monitoring device 30, whether charging that is being currently carried out at the charging facility is complete or not. If charging at the charging facility is complete, the process proceeds to step 302.

In step 302, the control device 22 generates a charging completion notification on the basis of, for instance, the current vehicle position according to the calculation result by the GPS receiver 26. The charging completion notification may be generated by incorporating information indicating the current vehicle position into information that indicates that charging is complete. The charging completion notification may include information relating to the power source type and the power source voltage of the charging facility, and relating to the type of the charging facility, if determined by the power source monitoring device 30. The charging completion notification may include vehicle identification information that is imparted to each vehicle. The vehicle identification information may be an on-board device identification (ID), a vehicle identification number (VIN) (frame number) or the like. The explanation below corresponds to an instance where the vehicle identification information is an on-board device ID.

The charging completion notification may be transmitted separately from other information, for instance information indicating the vehicle position. In this case, the other information, for instance the information indicating the vehicle position, is transmitted to the center server 10 in a manner such that the information is associated (one-to-one correspondence relationship) with information that indicates that charging at the charging facility is complete (successful). To avoid an overly complex explanation, an instance is described below wherein, for convenience, the other information, for instance the information indicating the vehicle position, is included in the charging completion notification and transmitted to the center server 10.

In step 304, the control device 22 transmits the charging completion notification generated in step 302 to the center server 10, via the radio device 24. The control device 22 transmits thus the charging completion notification to the center server 10 each time the charging is carried out at the charging facility. In a case where an attempt at charging in the charging facility is unsuccessful on account of, for instance, conflicting standards, the charging completion notification is not transmitted to the center server 10. Nevertheless, a notification indicating such charging incompatibility may be transmitted to the center server 10, since such notification may be useful for determining the standard or specification of the charging facility.

The information indicating the vehicle position included in the charging completion notification in step 302 and transmitted to the center server 10 is information that indicates the vehicle position at the time of charging, and essentially indicates position information on the charging facility. Therefore, each time a vehicle is charged at a charging facility, the center server 10 receives (gathers), as needed, position information on the charging facility.

Figure 4:
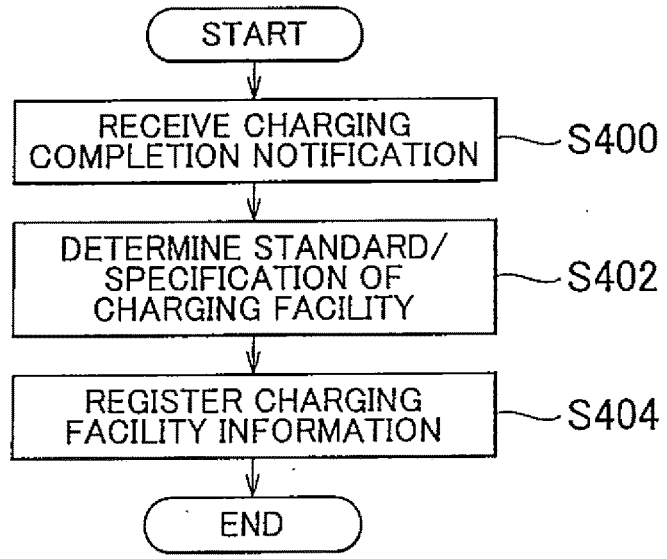
FIG. 4 is a flowchart illustrating an example of a main process executed in a center server.

FIG. 4 is a flowchart illustrating an example of a main process executed by the center server 10.

In step 400, the receiver 12 receives the charging completion notification that is transmitted by the on-board device 20 (see step 304 in FIG. 3).

In step 402, the processing unit 14 determines the standard or specification of the charging facility pertaining to the charging completion notification that is received in step 400. Herein, the standard or specification of the charging facility may include the power source type (AC or DC) of the charging facility, and the power source voltage (100 V, 200 V) of the charging facility. The standard or specification of the charging facility may include information relating to the specification of a charging outlet in the charging facility. The specification of the charging outlet in the charging facility may relate to the shape of the outlet, and may be, for instance, a locking-type outlet (refer to JIS C 8303, Annex A.25), a flat blade-type outlet for 200 V (refer to flat blade-type 20A, JIS C 8303, Annex A.16), flat blade-type outlet for 100 V (refer to flat blade-type 15A, JIS C 8303 Annex A.9), and retaining type outlet (JIS C 8303, Annex A.17). The standard or specification of the charging facility may include information on the type of a pole-mounted charger, namely whether the charger is cable-equipped or cable-less. In a cable-less charging facility, the user must bring a dedicated charging cable (dedicated charging cable furnished as an accessory to the vehicle). In a cable-equipped charging facility, a cable is attached to the charging facility, and the user need not furnish a dedicated charging cable. In case of a cable-equipped charging facility, the standard or specification of the charging facility may include information indicating the type of the charging facility. For instance, a cable-equipped charging facility may be a simple charging facility, or a highly functional charging facility (charging facility having an earth leakage circuit breaker, a charging controller and/or a communication function).

In step 402, the processing unit 14 may determine the standard or specification of the charging facility on the basis of various information items that may be included in the charging completion notification from the on-board device 20 (for instance, the power source type of the charging facility and the power source voltage of the charging facility). The processing unit 14 may determine the standard or specification of the charging facility on the basis of vehicle identification information that may be included in the charging completion notification from the on-board device 20, since the vehicle type (vehicle model) is associated with the standard or specification under which that type of vehicle can be charged. In other words, a certain vehicle model may fail to conform to a given standard or specification of the charging facility, and may not be able to be charged, but a different vehicle model may be charged in accordance with the standard or specification of the charging facility. Therefore, such an association may be used to determine the standard or specification of the charging facility. The processing unit 14 may determine the standard or specification of the charging facility on the basis of published information relating to the standard or specification of the charging facility. Such published information may be information directly notified (published) by the charging facility. The processing unit 14 may determine the standard or specification of the charging facility on the basis of input information from an operator of the center server 10 (typically, a manager that manages the center server 10). In this case, the operator may input information relating to the standard or specification of the charging facility as a result of, for instance, independent inspection (such as field inspection). The processing unit 14 may determine the standard or specification of the charging facility on the basis of information from a user. In this case, the user may provide, to the center server 10, information relating to the standard or specification of the charging facility on the basis of information that has been obtained during charging. Such information may be included, for instance, in the charging completion notification and be transmitted, or may be associated with the charging completion notification and be transmitted separately from the charging completion notification. In the former case, the control device 22 of the on-board device 20 may request the user to input "information relating to the standard or specification of the charging facility", for instance via an interactive user interface. The above determination methods may be used in the form of arbitrary combinations thereof.

In step 404, the processing unit 14 generates charging facility information, and stores and registers the information in the charging facility database 16, on the basis of the received charging completion notification from the on-board device 20 in step 400, and on the basis of the determination result in step 402. The charging facility information includes vehicle position information (i.e., position information on the charging facility) included in the charging completion notification from the on-board device 20, along with information (standard/specification information) relating to the standard or specification of the charging facility as determined in step 402. The position information on the registered charging facility may be position information on the charging facility included in the charging completion notification, as received from the on-board device 20, without modification, or may be corrected information. For instance, the processing unit 14 may correct the position information on the registered charging facility on the basis of input information from the operator of the center server 10. In this case, the operator of the center server 10 may input, on the basis of map data, a corrected value so as to conform to the map. The operator may in this case register the position of the charging facility on the map data. Alternatively, the operator may input the corrected value on the basis of an average or dispersion of a plurality of position information items obtained from vehicles relating to the same charging facility.

FIG. 5 is a diagram illustrating an example of charging facility information that is stored/registered in the charging facility database 16. As illustrated in FIG. 5, the charging facility information is stored/registered in the charging facility database 16 in a manner such that position information on the charging facility is associated with standard/specification information on the charging facility. For instance, the charging facility information relating to a charging facility with a facility ID of "A005667" is stored/registered in a manner such that standard/specification information (AC1, AC2) is associated with position information on the charging facility (latitude, longitude). Herein, AC1 indicates that the power source voltage of the charging facility is AC 100 V, and AC2 indicates that the power source voltage of the charging facility is AC 200 V. Also, DC indicates that the power source type of the charging facility is "DC".

In the embodiment, thus, each time a vehicle is charged, information relating to the charging facility (position information on the charging facility and so forth) obtained during charging is supplied to the center server 10. Therefore, the center server 10 can gather effectively information relating to the charging facility, and can generate charging facility information with high precision. Unlike gas stations, charging facilities can be installed comparatively easily, and hence, new charging facilities may be deployed in large numbers. The center server 10 can nevertheless track and respond, with high precision, to changes in such charging facilities.

In the charging facility information registered in the charging facility database 16 of the embodiment, moreover, standard/specification information on the charging facility is associated with position information on the charging facility. The usefulness of the charging facility information can be enhanced thereby. In a case where, for instance, the center server 10 provides the charging facility information to a user, the user can learn not only the position of the charging facility, but also whether the user's vehicle can be charged or not at that charging facility, on the basis of the standard/specification information. As a result, it becomes possible to prevent inconveniences that may occur when only the position of the charging facility is provided. If, for instance, only the position of the charging facility is provided, an inconvenience may occur in that, after a vehicle has reached the charging facility, charging cannot be performed there due to differences in the standard or specification of the charging facility, such as differences in the power source voltage of the charging facility. In the embodiment, by contrast, the standard/specification information on the charging facility is associated with the position information on the charging facility, which allows preventing the occurrence of such an inconvenience. Therefore, the embodiment is appropriate for instances where, in particular, the standards or specifications of the charging facilities are not unified, and, as a result, the vehicles (vehicle models) that are appropriate for each charging facility are different.

FIG. 6 is a diagram illustrating an example of the way in which the center server 10 provides the charging facility information to the user. FIG. 6 illustrates schematically an example of a screen in which information based on the charging facility information as registered in the charging facility database 16 is superposed on a map that is displayed on a user terminal (for instance, a navigation device or a smart phone).

In FIG. 6, marks P1 and P2 are marks that indicate the positions of charging facilities. Such marks may be displayed on a map display on the user terminal. Herein, for instance, the mark P1 is a mark generated on the basis of published information, and indicates a representative position (for instance, a central position) of a given facility. The mark P2, on the other hand, is a mark generated on the basis of the charging facility information that is generated in accordance with the embodiment. In the embodiment, the position information on the charging facility as registered in the charging facility database 16 is vehicle position information that is obtained by the on-board device 20 according to the GPS receiver 26, and therefore has higher precision than the published information. Ordinarily, for instance, published information merely reports the presence of a charging facility in the parking lot of a leisure facility. By contrast, the position information on the charging facility as registered in the charging facility database 16 allows determining at which section of the parking lot of the leisure facility the charging facility is present. This effect is particularly useful, since, unlike gas stations, charging facilities are comparatively small-scale facilities (facilities whose locations are difficult to find).

In FIG. 6, for instance, a configuration is also possible wherein the standard/specification information on the charging facility is displayed upon selection (for example, upon touching) of the mark P2 by the user. As a result, the user can obtain the standard/specification information on the charging facility along with the high-precision position information, as described above.

Figure 7:
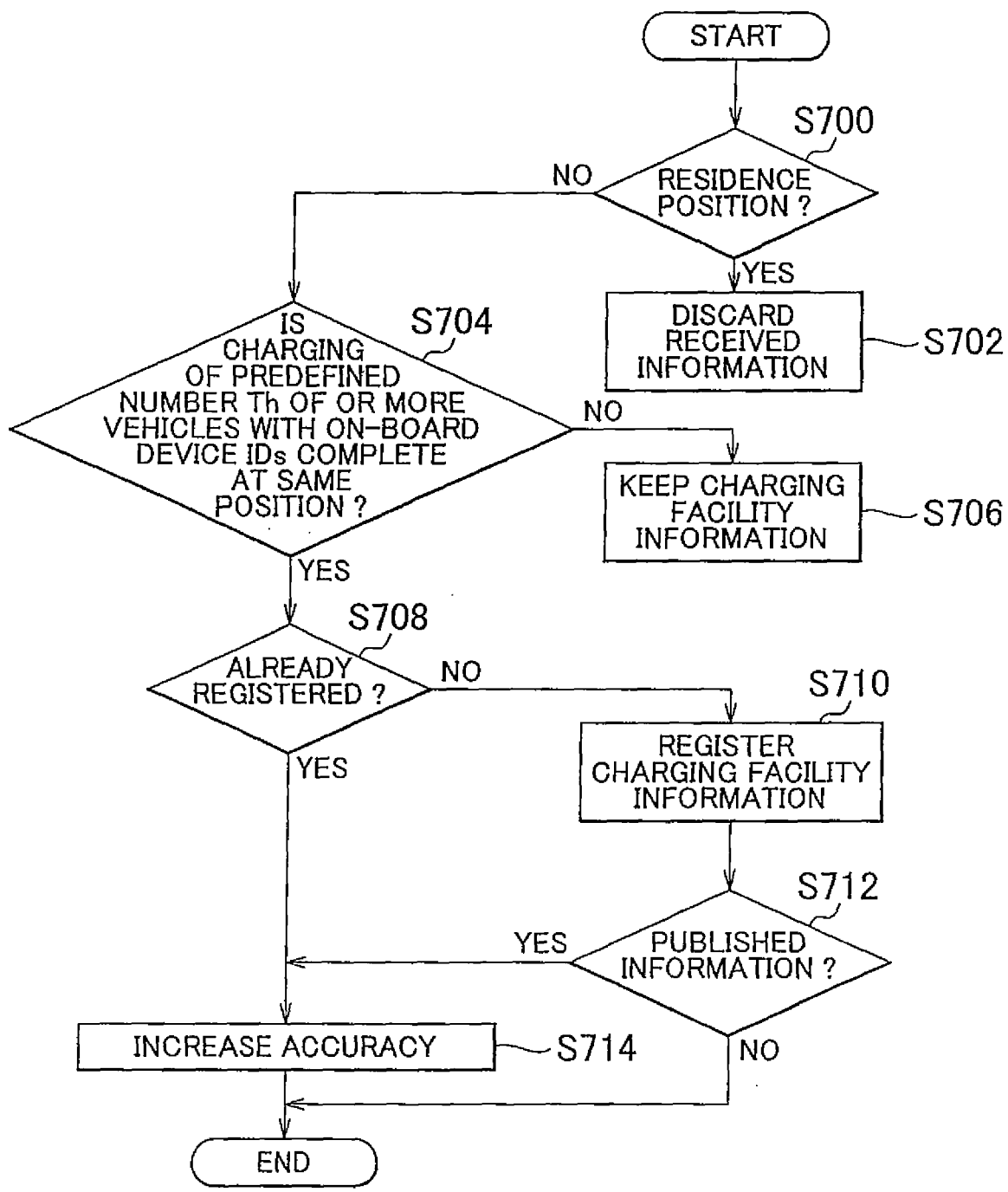
FIG. 7 is a flowchart illustrating an example of a registration process executed in the center server.

FIG. 7 is a flowchart illustrating an example of a registration process executed by the center server 10. The registration process illustrated in FIG. 7 may be executed in the form of the process of step 404 in the flowchart of FIG. 4. The registration process illustrated in FIG. 7 is used in an instance where the charging completion notification includes, in addition to the position information on the charging facility, identification information on the vehicle. FIG. 8 is a diagram illustrating an example of charging facility information that is kept in the charging facility database 16 (charging facility information before registration)

In step 700, the processing unit 14 determines whether the position information on the charging facility included in the received charging completion notification indicates the position of a user's residence. For instance, the processing unit 14 determines whether the position information on the charging facility indicates a user residence position on the basis of residence position information on each user, which is registered beforehand, and on the basis of the vehicle identification information included in the charging completion notification. Alternatively, the processing unit 14 may determine whether the position information on the charging facility indicates a user residence position on the basis of input information from the operator of the center server 10. If it is determined that the position information on the charging facility indicates the residence position of the user, the process proceeds to step 702; otherwise, the process proceeds to step 704.

In step 702, the processing unit 14 discards information that is included in the received charging completion notification. This allows preventing, as a result, registration of charging facility information relating to a personal charging facility (charging facility that is not open to unspecified users). In a case where, for instance, charging is performed at a charging facility in a private location, for instance a house, a condominium, a building or the like, a corresponding charging completion notification may be transmitted to the center server 10. However, registration of the charging facility in such a private location can be prevented in that case. The on-board device 20 may be configured so as to determine/detect that charging has been performed at a charging facility in a private location. In this case, the on-board device 20 may be configured in such a manner that, upon determination that charging has been performed at a charging facility in a private location, no charging completion notification is transmitted to the center server 10. The determination process of step 700 may be omitted if all the on-board devices 20 have this configuration.

In step 704, the processing unit 14 determines whether charging of a predefined number Th of or more different vehicles is complete (executed) at the same position, on the basis of the vehicle identification information and the position information on the charging facility included in the received charging completion notification. That is, the processing unit 14 determines whether or not the number of different on-board device IDs that provide position information on the same charging facility is equal to or larger than the predefined number Th. For instance, the processing unit 14 refers to the charging facility information that is kept in the charging facility database 16 such as the one illustrated in FIG. 8 (charging facility information before registration), calculates the number of on-board device IDs that are associated with the charging facility information that is substantially identical to the position information on the charging facility as currently received, and determines whether the total number of on-board device IDs that include the current on-board device IDs is equal to or larger than the predefined number Th. The predefined number Th is a threshold value for determining whether the charging facility is a personal charging facility or a public charging facility (charging facility open to unspecified users), and may be an arbitrary appropriate value. The predefined number Th may be, for instance, a value such as 2 or 3. If it is determined that charging of the predefined number Th of or more different vehicles is complete at the same position, then the process proceeds to step 708; otherwise, the process proceeds to step 706.

In step 706, the processing unit 14 keeps the charging facility information generated on the basis of information included in the received charging completion notification. The kept charging facility information may be generated similarly on the basis of the determination result in step 402 in the flowchart illustrated in FIG. 4, or may be generated using only information included in the received charging completion notification. Thus, the charging facility information is kept as a registration candidate if it is not yet determined whether the charging facility is a personal charging facility or a public charging facility. That is, there is generated the charging facility information kept in the charging facility database 16 as illustrated in FIG. 8 (charging facility information before registration).

In step 708, the processing unit 14 determines whether the position information on the charging facility included in the received charging completion notification is already registered or not. For instance, the processing unit 14 compares the position information on the charging facility included in the received charging completion notification, with the charging facility information stored/registered in the charging facility database 16 such as the one illustrated in FIG. 5, and determines whether the position information pertaining to the same charging facility is registered or not. This determination may be carried out by determining whether or not a deviation in the position information on the charging facility lies within a predefined error. If the position information pertaining to the same charging facility is registered, the process proceeds to step 714. If there is registered no position information pertaining to the same charging facility, the process proceeds to step 710.

In step 710, the processing unit 14 registers the charging facility information generated on the basis of the information included in the received charging completion notification. The registered charging facility information may be generated similarly on the basis of the determination result of step 402 in the flowchart illustrated in FIG. 4. The charging facility information relating to a charging facility determined to be in a public charging facility is registered thus. That is, there is generated the charging facility information (already-registered charging facility information) that is registered in the charging facility database 16 such as the one illustrated in FIG. 5. Examples of public charging facilities include charging facilities that are located at leisure facilities such as shopping malls, as well as car dealers, convenience stores, public facilities, service areas, hospitals, pay-by-the-hour parking lots and the like.

If there is obtained new standard/specification information that is different from the already-registered standard/specification information, on the basis of the charging completion notification currently received, the new standard/specification information may be additionally registered in the charging facility database 16, even if, in step 708, the position information pertaining to the same charging facility is already registered. In this case as well, the new standard/specification information may be additionally registered in the charging facility database 16 if the new standard/specification information is provided from a predefined number of or more different vehicles.

In step 712, the processing unit 14 determines whether the charging facility information currently registered in step 710 corresponds to published information. The published information may be information directly notified (published) by the charging facility. The processing unit 14 may determine whether the charging facility information currently registered in step 710 corresponds to published information, on the basis of the input information from the operator of the center server 10. The published information may have low precision, particularly in terms of the position information. Therefore, the position information may lie within a predefined error range. The predefined error may be decided in accordance with the size of the facility at which the charging facility is located, since the position information based on published information may correspond to a central position in the building (site) where the charging facility is installed. If the currently registered charging facility information corresponds to published information, the process proceeds to step 714; otherwise, the process ends there.

In step 714, the processing unit 14 increases the accuracy (reliability) of the charging facility information that is registered in the charging facility database 16 and that is pertaining to the charging completion notification currently received. More specifically, the accuracy of the charging facility information currently registered in the charging facility database 16 is increased in a case where the charging facility information corresponds to published information (see step 712). If the position information pertaining to the same charging facility is already registered (see step 708), there is increased the accuracy of the already-registered charging facility information pertaining to that charging facility. For instance, the processing unit 14 may increase the accuracy by a predefined accuracy a each time. In this case, the accuracy P may be expressed by $P=P_0+\Delta P \times N$, wherein an initial value is $P_0$ (P=100 when P>100). Thus, as the number of vehicles, from which the charging completion notification relating to the same charging facility is received, increases, the accuracy of the charging facility information pertaining to the charging facility is increased. The accuracy is the accuracy of the charging facility information itself, and may be accuracy that indicates that the charging facility pertaining to charging facility information is a public charging facility. Thus, the accuracy may be decided in consideration of whether the charging facility information is published as a public charging facility, and/or in consideration of the number of different on-board device IDs that provide position information on the same charging facility.

In a configuration where, as described above, information relating to a charging facility (for instance, position information on the charging facility), which is obtained each time a vehicle is charged, is provided to the center server 10, the center server 10 can efficiently gather information relating to the charging facility, and can generate charging facility information with high precision. By contrast, however, information relating to a charging facility that is not public, for instance a home charging facility of an individual, may also be provided to the center server 10. Providing such charging facility information on a non-public charging facility to other users is pointless (since charging is not possible there), and, on the contrary, may be inconvenient (for instance, a user may find out that charging is not possible at the charging facility of a personal (third party's) residence, after having been led to that charging facility).

The center server 10 determines thus, according to the process illustrated in FIG. 7, whether the charging facility is a charging facility that can be used by an unspecified user, with regard to the information relating to the charging facility, which is received from each vehicle. If the center server 10 determines that the charging facility can be used by an unspecified user, the center server 10 registers the information relating to the charging facility. Therefore, the process illustrated in FIG. 7 allows appropriately preventing registration of charging facility information on a charging facility that is not public. The center server 10 may register charging facility information on a charging facility that is not public, separately from charging facility information on a public charging facility, but without providing, to the user, the charging facility information on the charging facility that is not public.

Through the process illustrated in FIG. 7, the center server 10 decides and gives the accuracy (reliability) of the charging facility information registered in the charging facility database 16. Therefore, for instance, it becomes possible for the user to determine the accuracy of the charging facility information, when the charging facility information is provided to the user. Alternatively, it is possible to employ a method in which only charging facility information with accuracy equal to or higher than a predefined level is provided to the user.

The embodiments of the invention have been explained above, but the invention is not limited to the above-described embodiments, and the invention may accommodate various modifications and alterations without departing from the scope of the invention.

In the above-described embodiments, for instance, the envisaged charging facility is a contact-type charging facility in which charging of vehicles is performed through connection via a charging cable. However, contact-less charging facilities and vehicles in which charging can be performed in a contact-less manner may be upcoming. Therefore, the standard/specification information may include also information indicating whether the charging facility is of contact type or contact-less type.

The invention claimed is:

1. A center server comprising:
a receiver that receives position information transmitted from an electric vehicle that is able to be charged externally, the position information being on a charging facility at which the electric vehicle that is able to be charged externally has been charged, and wherein the receiver receives a charging incompatibility notification from an electric vehicle that is not able to be charged externally at the charging facility, wherein the center server is located remotely from the charging facility;
a storage device; and
a processing unit programmed to:
determine at least one of a standard or a specification of the charging facility pertaining to the position information received by the receiver, wherein the at least one of the standard or the specification of the charging facility includes a category or charger type of the charging facility,
associate standard/specification information indicating at least one of the standard or the specification of the charging facility with the position information on the charging facility, and
store the associated information in the storage device, wherein
the receiver receives identification information of the electric vehicle transmitted from the electric vehicle that is able to be charged externally at the charging facility,
the processing unit is further programmed to determine the at least one of the standard or the specification of the charging facility on the basis of the charging incompatibility notification transmitted from the electric vehicle that is not able to be charged externally at the charging facility, and
the processing unit is further programmed to: provide an update to another electric vehicle that is not the electric vehicle that is able to be charged externally at the charging facility by transmitting displayable information based on the determined at least one of the standard or the specification of the charging facility and the position information of the charging facility.

2. The center server according to claim 1, wherein the standard/specification information includes information relating to at least one of: whether a power source type of the charging facility is alternate current or direct current, or a magnitude of a power source voltage.

3. The center server according to claim 1, wherein
the standard/specification information includes at least one of: information relating to whether a power source type of the charging facility is alternate current or direct current, or information relating to the magnitude of the power source voltage; and
the processing unit determines the standard or specification of the charging facility on the basis of the standard/specification information received by the receiver that includes the at least one of: the information relating to whether the power source type of the charging facility is alternate current or direct current, or the information relating to the magnitude of the power source voltage.

4. The center server according to claim 1, wherein the processing unit
determines whether the charging facility, the position information on which is received by the receiver, is a facility that is able to be used by an unspecified user, and
when the processing unit determines that the charging facility is able to be used by the unspecified user, the processing unit associates the position information with the standard/specification information pertaining to the charging facility, and registers the associated information in the storage device.

5. The center server according to claim 4, wherein
the receiver receives identification information of the electric vehicle that transmits the position information on the charging facility, from the electric vehicle that is able to be charged externally at the charging facility;
the processing unit determines, on the basis of the identification information of the electric vehicle that is able to be charged externally at the charging facility, whether the position information pertaining to the same charging facility is received from a predefined number or more of electric vehicles; and
when the processing unit determines that the position information pertaining to the same charging facility is received from the predefined number or more of electric vehicles, the processing unit determines that the charging facility is able to be used by the unspecified user.

6. The center server according to claim 1, wherein the processing unit decides an accuracy of registered information pertaining to each charging facility.

7. The center server according to claim 6, wherein as the number of electric vehicles, from which the receiver has received the position information relating to the same charging facility, increases, the processing unit increases the accuracy of the registered information pertaining to the charging facility.

8. A charging facility registration system comprising:
the center server according to claim 1; and
an on-board device that is installed in the electric vehicle that is able to be charged externally at the charging facility, and that transmits to the center server at least the position information upon completion of charging, in the charging facility, of the electric vehicle on which the on-board device is installed.

9. A charging facility registration method comprising:
receiving, by a center server, position information transmitted from an electric vehicle that is able to be charged externally, the position information being on a charging facility at which the electric vehicle that is able to be charged externally has been charged, and receiving, by the center server, a charging incompatibility notification from an electric vehicle that is not able to be charged externally at the charging facility;
determining, by the center server, at least one of a standard or a specification of the charging facility pertaining to the received position information, wherein the center server is located remotely from the charging facility;
associating, by the center server, standard/specification information indicating the at least one of the standard or the specification of the charging facility with the position information on the charging facility, wherein the at least one of the standard or the specification of the charging facility includes a category or charger type of the charging facility;

storing the associated information in a storage device; and providing an update to another electric vehicle that is not the electric vehicle that is able to be charged externally at the charging facility by transmitting displayable information based on the determined at least one of the standard or the specification of the charging facility and the position information of the charging facility, wherein the center server receives identification information of the electric vehicle transmitted from the electric vehicle that is able to be charged externally at the charging facility, and the center server determines the at least one of the standard or the specification of the charging facility on the basis of the charging incompatibility notification transmitted from the electric vehicle that is not able to be charged externally at the charging facility.

10. The charging facility registration method according to claim 9, further comprising:

determining whether the charging facility, the position information on which is received, is a facility that is able to be used by an unspecified user; and when it is determined that the charging facility is able to be used by the unspecified user, associating the position information with the standard/specification information pertaining to the charging facility, and registering the associated information in the storage device.

11. The center server according to claim 1, wherein the processing unit is further programmed to determine the at least one of the standard or the specification of the charging facility on the basis of identification information of the electric vehicle that is able to be charged externally at the charging facility, and the identification information includes at least one of: an on-board device identification, a vehicle identification number (VIN), or a vehicle model of the electric vehicle.

12. The charging facility registration method according to claim 9, further comprising determining the at least one of the standard or the specification of the charging facility on the basis of identification information of the electric vehicle that is able to be charged externally at the charging facility, wherein the identification information of the electric vehicle that is able to be charged externally at the charging facility includes at least one of: an on-board device identification, a vehicle identification number (VIN), or a vehicle model of the electric vehicle.

13. The center server according to claim 1, wherein the processing unit is programmed to determine the at least one of the standard or the specification of the charging facility on the basis of the charging incompatibility notification transmitted from the electric vehicle that is not able to be charged externally at the charging facility.

14. A center server comprising:

one or more memories;

a communication interface configured to communicate over a network with at least two or more devices associated with two or more electric vehicles that are able to be charged externally; and a processor programmed to:

responsive to receiving, via the communication interface, from a device associated with an electric vehicle, a charging successful or complete notification that incorporates charging facility standard/specification information and a current vehicle position at a charging facility at which the electric vehicle has successfully or completely charged with information that indicates that a charging is successful or complete: (i) generate successful charging facility information that includes position information based on the current vehicle position included in the charging successful or complete notification and charging facility type information based on the charging facility standard/specification included in the received charging successful or complete notification, (ii) determine whether the position information in the received charging successful or complete notification corresponds to position information already stored in a database of the one or more memories, (iii) if the position information in the received charging successful or complete notification corresponds to the position information already stored in the database, and the device associated with the electric vehicle is a different device than a vehicle device associated with the position information already stored in the database, increase an accuracy or reliability of the charging facility, and (iv) if the position information in the received charging successful or complete notification does not correspond to the position information already stored in the one or more memories, store, as a new facility in the database, the generated successful charging facility information on the basis of the received charging successful or complete notification; and based on the number of different devices that have provided the position information on the same charging facility, or based on an accuracy or a reliability of the charging facility equaling or exceeding a predetermined accuracy or reliability threshold amount, provide an update, by transmitting via the communication interface, to another device that is associated with another electric vehicle that is different from the electric vehicle, displayable information based on the charging facility information on the basis of the number of different devices that have provided the position information on the same charging facility or the accuracy or reliability of the charging facility having received the charging successful or complete notification, wherein the communication interface is further configured to: receive a charging incompatibility notification from another electric vehicle that is not able to be charged externally at the same charging facility, after an unsuccessful attempt to charge.

15. The center server registration according to claim 14, wherein the charging successful or complete notification includes information relating to at least one of: a power source type or a power source voltage of the charging facility.

16. The center server registration according to claim 14, wherein the charging successful or complete notification includes information relating to a type of the charging facility determined by a power source monitoring function of the device associated with the electric vehicle, the device being an on-board vehicle device attached to the electric vehicle.

* * * * *